United States Patent [19]

Sugimura et al.

[11] Patent Number: 4,812,337

[45] Date of Patent: Mar. 14, 1989

[54] METALLIC COATING METHOD

[75] Inventors: You Sugimura, Odawara; Nobushige Numa, Ebina; Tadashi Watanabe, Hiratsuka; Yutaka Sugiyama, Ayase; Kazuhiko Ohira, Nagoya; Sachio Yamaguchi, Hiratsuka, all of Japan

[73] Assignee: Kansai Paint Company, Limited, Amagasaki, Japan

[21] Appl. No.: 122,721

[22] Filed: Nov. 18, 1987

[30] Foreign Application Priority Data

Nov. 25, 1986 [JP] Japan .................. 61-281362
Dec. 29, 1986 [JP] Japan .................. 61-313266

[51] Int. Cl.$^4$ .................. B05D 1/36; B05D 7/00
[52] U.S. Cl. .................. 427/407.1; 427/409; 524/520
[58] Field of Search .................. 427/388.5, 407.1; 427/409; 524/520

[56] References Cited

U.S. PATENT DOCUMENTS

| | | | |
|---|---|---|---|
| 3,544,663 | 12/1970 | Hauptschein et al. | 524/520 X |
| 4,463,038 | 7/1984 | Takeachi et al. | 427/409 X |
| 4,490,417 | 12/1984 | Shindow et al. | 427/409 X |
| 4,564,561 | 1/1986 | Lore et al. | 524/520 X |
| 4,668,570 | 5/1987 | Esselborn et al. | 427/409 X |

*Primary Examiner*—Michael Lusignan
*Attorney, Agent, or Firm*—Armstrong, Nikaido, Marmelstein & Kubovcik

[57] ABSTRACT

Disclosed is a coating method for forming a metallic coat, comprising the steps of applying to a substrate a base coating composition containing a metallic pigment and applying a clear top coating composition to the coated surface, the method being characterized in that the clear top coating composition is a curable one comprising as a main component a nonaqueous dispersion of a polymer of a radically polymerizable monomer, said dispersion containing as a dispersion stabilizer a fluorine-containing copolymer comprising a hydroxyl group-containing monomer and a perfluoroalkyl group-containing acrylic or methacrylic monomer represented by the following formula (1)

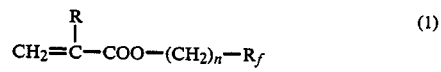

wherein R is a hydrogen atom or a methyl group, n is an integer of 1 to 11 and $R_f$ is a straight chain or branched chain perfluoroalkyl group having 1 to 21 carbon atoms.

6 Claims, No Drawings

METALLIC COATING METHOD

The present invention relates to a method for forming a two-layer metallic coat comprised of a base coat containing a metallic pigment and a clear top coat, and more particularly to a metallic coating method comprising the steps of applying a base coating composition to a substrate and then applying a top coating composition to the coated surface.

Metallic coating methods comprising applying a base coating composition to a substrate and then applying a top coating composition to the coated surface are divided into 2-coat 1-bake system and those by 2-coat 2-bake system.

Metallic coating methods the 2-coat 1-bake system frequently employ a thermosetting base coating composition predominantly containing an acrylic resin, alkyd resin, urethane resin or the like, and a thermosetting clear top coating composition predominantly containing an acrylic resin, alkyd resin or the like. In such 2-coat 1-bake method, a clear top coating composition is applied before curing of the base coating composition with the result that the metallic pigment contained in the base coating composition tends to migrate into the clear top coating composition, leading to mottling in metallic texture. Consequently in order to prevent the mottling in metallic texture, a resin composition different in physical or chemical properties from a base coating composition has been generally used as a top coating composition.

However, the metallic coat formed from such coating compositions poses the problem that because the resin component in the clear top coat is deteriorated by ultraviolet light during a long-term outdoor exposure, the top coat suffers flaws such as impaired gloss, cracks, peels and the like. This metallic coat has a further drawback of being prone to blistering because the resin compositions of different characteristics are used respectively as a base coating composition and a clear top coating composition.

To improve the weatherability of a metallic coat from this viewpoint, attempts have been made to use as a clear top coating composition a dispersion-based coating composition of fluorine-containing resin comprising a polyfluorovinylidene resin powder dispersed in a solution of acrylic resin or a solution-based coating composition of fluorine-containing copolymer of fluoroolefin, vinyl ether and hydroxyl group-containing vinyl ether. The use of such coating compositions is intended to utilize the characteristics of fluorine-containing resin such as low intermolecular cohesion, outstanding chemical stability, weatherability, water repellency, oil repellency and stain resistance, non-adherence and ability to form a coat of low refractive index. However, these coating compositions, have the following drawbacks.

When the former dispersion-based coating composition of fluorine-containing resin is used as a clear top coating composition, the clear top coat formed therefrom is insufficient in transparency and is inferior to the coats produced from conventional top coating compositions in metallic effect, gloss, distinctness-of-image gloss and other properties. Further this dispersion-based coating composition is not able to achieve a sufficient degree of the effects peculiar to the fluorine-containing resins, and thus fails to exhibit a fully improved weatherability. On the other hand, when the latter solution-based coating composition of fluorine-containing copolymer is used as a clear top coating composition, a fluorine-containing monomer is used in an amount sufficient to cause the copolymer to display fully the foregoing characteristics of fluorine-containing resin, resulting in formation of a top coat impaired in the properties essentially required of coats such as thermal and mechanical properties including heat resistance, adhesion to a base coat, hardness, impact resistance and the like. Consequently it is difficult to produce from such coating composition a top coat having both the properties essentially required of coats and the characteristics imparted by the presence of the fluorine atom. Moreover, since fluorine-containing monomers are considerably expensive as compared with polymerizable vinyl monomers commonly used, it is important that the copolymer achieve the desired effect with a minimum content of fluorine-containing monomer.

Although disadvantageous in requiring an additional procedure, the 2-coat 2-bake metallic coating methods are advantageous in the following. Because the top coating composition is applied after curing of the base coat composition, the top coat formed is unlikely to have a mottle of metallic texture caused by the migration of the metallic pigment to the top coat. Accordingly resin compositions of similar characteristics may be used as a base coating composition and a top coating composition, whereby blistering between the coats can be prevented. Nevertheless, the 2-coat 2-bake methods remain to be improved with respect to the problem that a clear top coat tends to deteriorate due to ultraviolet light or the like during a long-term outdoor exposure. Thus the method is also required to form a top coat of good weatherability.

It is an object of the present invention to provide a method for forming a metallic coat which is higher in weatherability and which is less likely to deteriorate over a prolonged period of time than the metallic coats given by conventional metallic coating methods.

It is another object to provide a method for forming a metallic coat, the method, even if carried out by a 2-coat 1-bake system, being capable of producing a metallic coat which is free of mottling in metallic texture, outstanding in distinctness-of-image gloss, heat resistance, adhesion, hardness, impact resistance and like properties and which is excellent in weatherability and not apt to have flaws attributable to a long-term outdoor exposure such as impaired gloss, cracks, blisters, peeling, decoloration and discoloration.

It is a further object to provide a method for forming a metallic coat using a clear top coating composition of fluorine-containing resin, the method being capable of producing a top coat which is free of the flaws given by the presence of the fluorine atom such as impaired gloss, deteriorated metallic effect, low hardness, reduced adhesion and poor impact resistance and which has the excellent characteristics imparted by the presence of the fluorine atom such as good weatherability, high water and oil repellency and stain resistance, non-adherence and the like.

The present invention provides a metallic coating method for forming a metallic coat, comprising the steps of applying to a substrate a base coating composition (hereinafter referred to as "base coating") containing a metallic pigment and applying a clear top coating composition to the coated surface, the method being characterized in that the clear top coating composition is a curable one comprising as a main component a nonaqueous dispersion of a polymer of a radically polymerizable monomer, said dispersion containing as a dispersion stabilizer a fluorine-containing copolymer comprising a hydroxyl group-containing monomer and a perfluoroalkyl group-containing acrylic or methacrylic monomer represented by the following formula (1)

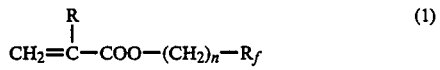

wherein R is a hydrogen atom or a methyl group, n is an integer of 1 to 11 and $R_f$ is a straight chain or branched chain perfluoroalkyl group having 1 to 21 carbon atoms.

The present invention has the feature that a curable coating composition is used as a clear top coating composition (hereinafter referred to as "top coating") in a metallic coating method for forming a two-layer metallic coat comprised of a base coat and a top coat, said curable coating composition comprising as a main component a nonaqueous dispersion of a polymer of a radically polymerizable monomer, said dispersion containing as a dispersion stabilizer a fluorine-containing copolymer comprising a perfluoroalkyl group-containing acrylic or methacrylic monomer of the formula (1) and a hydroxyl group-containing monomer. The dispersion is hereinafter referred to as "F-NAD".

The coating method of the present invention is capable of producing a metallic coat including a top coat which has both the properties essentially required of coats and the characteristics imparted by the presence of the fluorine atom, namely a top coat which is excellent in the properties peculiar to fluorine-containing resins such as chemical stability, weatherability, water repellency, oil repellency, stain resistance, non-adherence and low refractive index and which is satisfactory in thermal, chemical and mechanical characteristics essentially required of coats such as heat resistance, alkali resistance, adhesion to a base coat, hardness, gloss, distinctness-of-image gloss, impact resistance and the like. Further the coating method of this invention provides a metallic coat whose tendency to deteriorate by a long-term outdoor exposure is extremely reduced.

The top coat formed by the method of the present invention has the above-mentioned excellent properties because the continuous phase of coat formed from F-NAD used in the invention is composed chiefly of the dispersion stabilizer (i.e. fluorine-containing copolymer). Thus the surface layer of the top coat mainly exhibits the properties imparted by the presence of the fluorine atom, such as excellent weatherability, water repellency, oil repellency and stain resistance, non-adherence and low refractive index. Moreover, the polymer particles of the dispersion serve to enhance the thermal, chemical and mechanical properties required of coats. In other words, the strength of coat can be improved by the reinforcing ability of the polymer particles and stress built up with time within the coat can be absorbed at the interface between the polymer particles and the dispersion stabilizer with the result that stress can be prevented from increasing, thereby eliminating a possibility of the stress developing to great energy sufficient to cause cracking and other damages throughout the coat. Furthermore, since the fluorine atom has only to be present in the continuous phase (dispersion stabilizer) and need not be contained in the interior of polymer particles in the dispersion, the dispersion can exhibit the characteristics imparted by the fluorine atom which are comparable to those attainable by the conventional solution of fluorine-containing copolymer prepared by solution polymerization method even if the dispersion contains a smaller amount of fluorine-containing monomer than the conventional solution. Accordingly the top coating of the invention has a further advantage of enabling the formation of coats favorable in terms of costs.

The top coat formed on the metallic pigment-containing base coat from the clear top coating by the method of the invention is free of flaws such as impaired gloss, cracks, peeling and blisters caused by a long-term exposure and thus is significantly improved in weatherability. Furthermore, the top coat thus formed can sustain the water repellency on its surface for a long period of time so that water is prevented from permeating through the coats and from gathering in between the coats among the primer, intercoat, base coat and top coat (i.e. blister). The use of F-NAD even if in a 2-coat 1-bake method provides a coat with a finish appearance having markedly improved gloss, distinctness-of-image gloss, metallic effect and like properties which, moreover, are retained for a prolonged period of time, and further the peeling, blistering and the like between the base coat and the top coat can be substantially completely prevented.

The present invention will be described below in more detail.

<Base coating>

The base coating is applied before application of the clear top coating. The base coating useful in the present invention includes a wide range of conventional coating compositions comprising a curable resin composition and a metallic pigment as main components and may be any of the organic solvent solution-based, nonaqueous dispersion-based, aqueous solution-based and aqueous dispersion-based coating compositions.

The above-mentioned curable resin composition is three-dimensionally cross-linked to cure and is substantially free of fluorine-containing resin. Useful curable resin compositions are thermosetting resin compositions comprising a cross-linking agent and a base resin such as acrylic resin, polyester resin, epoxy resin, urethane resin, alkyd resin or the like. Preferred examples of useful base resins are acrylic resin, polyester resin and the like. These base resins are usable singly or at least two of them can be used in mixture. A cross-linking agent suitably selected depending on the kind of base resin is usable. Examples thereof are amino resin, blocked polyisocyanate compound, etc. Moreover, also usable as the resin compositions are those which comprise a base resin and a cross-linking agent such as a polyisocyanate compound or the like and which are cross-linkable by standing at room temperature or by heating to a low temperature of about 140° C. or lower.

Such resin compositions may contain a resin which is not cross-linkable, such as cellulose acetate butyrate resin or the like.

Examples of useful metallic pigments are auminum powder, copper powder, mica powder, micaceous powder consisting of mica particles coated with titanium oxide or iron oxide, MIO (micaceous iron oxide) and the like. Preferred amount of the metallic pigment is about 1 to about 30 parts by weight (calculated as solids) per 100 parts by weight of the resin composition.

The base coating may further contain a suitable amount of color pigment or extender pigment and the like.

Of base coatings useful in the present invention, the organic solvent solution-based coating compositions can be prepared by dissolving the above-mentioned resin composition in an organic solvent useful for coating compositions and dispersing the metallic pigment in the organic solvent. Useful organic solvent include those which can be used for conventional metallic pigment-containing coating compositions, such as toluol, xylol, petroleum solvents and like hydrocarbon solvents, ethyl acetate, butyl acetate, ethylene glycol monoethyl ether acetate and like ester solvents, methyl ethyl ketone, methyl isobutyl ketone and like ketone solvents, ethylene glycol monoethyl ether, diethylene glycol monobutyl ether and like ether solvents, methanol, butanol and like alcohol solvents, etc.

The nonaqueous dispersion-based coating compositions are those having dispersed particles of coating resin and a metallic pigment in a solution of dispersion stabilizer in an organic solvent. Basically such coating compositions are prepared by known methods, for example, by polymerizing a radically polymerizable monomer in a solution of a dispersion stabilizer in an organic solvent. Preferred examples of useful organic solvents are hexane, heptane, octane, mineral spirit and like aliphatic hydrocarbon solvents. Also included among useful solvents are cellosolve acetate, cellosolve carbitol, butyl acetate, toluol, xylol and like esters, ethers and aromatic hydrocarbon solvents. Useful dispersion stabilizers are amphipathic resins which have two portions one of which is soluble in these organic solvents and and the other of which is compatible with the dispersed polymer. Specific examples thereof are polyester resins, acrylic resins, natural rubber, cellulose, graft copolymers of such stabilizers and vinyl monomers, etc. Radically polymerizable monomers to be polymerized in a solution of dispersion stabilizer in an organic solvent include those exemplified below as useful in preparation of F-NAD.

The aqueous solution-based coating compositions are prepared by dissolving in deionized water a resin composition containing a water-soluble base resin and dispersing a metallic pigment therein.

The aqueous dispersion-based coating compositions are those having the particles of coating resin dispersed in deionized water. Such coating compositions are prepared from a resin composition containing a water-dispersible base resin by known methods.

It is preferable that the base coatings as described above have a solids concentration of about 20 to about 60% by weight.

Of the above-mentioned base coatings, the nonaqueous dispersion-based coating compositions are preferably used because the mechanical strength of coats and the interlayer adhesion can be improved by the particles of polymer contained in the coating composition so that cracking, blistering, peeling and mottle of metallic texture can be more effectively prevented.

<Top coating>

The clear top coating is applied to the base coat and is a curable coating composition which is capable of forming a transparent coat and which contains F-NAD as the main component.

The fluorine-containing copolymer to be used as a dispersion stabilizer in F-NAD is a copolymer comprising the perfluoroalkyl group-containing acrylic or methacrylic monomer represented by the formula (1) and a hydroxyl group-containing monomer.

Useful perfluoroalkyl group-containing acrylic or methacrylic monomers of the formula (1) can be any of those known in the art, insofar as they are in the range of the formula (1). Of these monomers, preferable are those wherein n is an integer of 1 to 4 and $R_f$ is a straight chain or branched chain perfluoroalkyl group having 1 to 10 carbon atoms. Examples of such fluorine-containing monomers are perfluoromethylmethyl acrylate, perfluoromethylmethyl methacrylate, perfluoropropylmethyl acrylate, perfluoropropylmethyl methacrylate, perfluorooctylundecyl acrylate, perfluorooctylundecyl methacrylate, perfluoropropylpropyl acrylate, perfluoropropylpropyl methacrylate, 2-perfluorooctylethyl acrylate, 2-perfluorooctylethyl methacrylate, 2-perfluoroisononylethyl acrylate, 2-perfluoroisononylethyl methacrylate, perfluoroisononylmethyl acrylate, perfluoroisononylmethyl methacrylate, etc. Of these monomers, preferable are perfluoromethylmethyl acrylate, perfluoroisononylmethyl methacrylate, 2-perfluorooctylethyl acrylate, 2-perfluorooctylethyl methacrylate and the like. These monomers are usable singly or at least two of them can be used in mixture.

The hydroxyl group-containing monomer is used in the present invention to render the fluorine-containing copolymer cross-linkable. Examples of such monomers are hydroxyalkyl ($C_2$–$C_8$) acrylate or methacrylate such as hydroxyethyl acrylate, hydroxyethyl methacrylate, hydroxypropyl acrylate, hydroxypropyl methacrylate and the like. In the present invention, these monomers are usable singly or at least two of them can be used in mixture.

The fluorine-containing copolymer can be prepared by copoylmerizing the perfluoroalkyl group-containing monomer of the formula (1) and the hydroxyl group-containing monomer, each selected from their respective examples given above, with, when required, other monomers in the presence of, for example, a radical polymerization initiator (e.g. azo-type initiator or peroxide-type initiator). The fluorine-containing copolymer contains about 1 to about 80% by weight, preferably about 20 to about 60% by weight, of the perfluoroalkyl group-containing acrylic or methacrylic monomer and about 5 to about 40% by weight, preferably about 10 to about 30% by weight, of the hydroxyl group-containing monomer. Usable as other monomers which can coexist with these monomers are a wide range of those known in the art which are copolymerizable with the above-mentioned monomers. Examples thereof are acrylic or methacrylic monomers including carboxyl group-containing monomers such as acrylic acid and methacrylic acid, amino monomers such as N,N-dimethylaminoethyl acrylate or methacrylate and N,N-diethylaminoethyl acrylate or methacrylate, $C_{1-18}$ alkyl acrylate or methacrylate such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, isobutyl methacrylate, hexyl methacrylate, octyl methacrylate and lauryl methacrylate; and vinyl aromatic compounds such as styrene, α-methyl styrene, vinyltoluene and the like; acrylonitrile, methacrylonitrile, crotonic acid, maleic acid; etc. These monomers are usable singly or at least two of them can be used in mixture. Of the above-exemplified monomers, preferable are methacrylic acid, isobutyl methacrylate, 2-ethylhexyl methacrylate, lauryl methacrylate, n-butyl methacrylate and styrene.

It is advantageous that the fluorine-containing copolymer used in the present invention have a weight-average molecular weight of about 5,000 to about 100,000 (number-average molecular weight of about 1,000 to about 60,000), preferably about 5,000 to about 50,000. The polymer with a molecular weight of less than 5,000 is likely to result in insufficient stability of the polymer particles in the dispersion and to induce agglomeration and sedimentation, whereas the polymer with a molecular weight of greater than 100,000 tends to significantly increase the viscosity of F-NAD so that F-NAD may become difficult to handle.

Preferable fluorine-containing copolymers of the invention are those having a polymerizable double bond in the molecule. The double bond can be introduced, for example, by using an acrylic acid, methacrylic acid or like carboxyl group-containing unsaturated monomer as the copolymerizing component in the fluorine-containing copolymer and reacting the carboxyl group with a glycidyl acrylate, glycidyl methacrylate, allyl glycidyl ether or like glycidyl group-containing unsaturated monomer. The introduction of the double bond can be also performed by reacting a glycidyl group- and fluorine-containing copolymer with a carboxyl group-containing unsaturated monomer. Other combinations are possible, such as those of acid anhydride group with hydroxyl group, those of acid anhydride group with mercapto group, those of isocyanate group with hydroxyl group, etc.

It is desirable that the fluorine-containing copolymer produced by the reaction have at least 0.1 mole of polymerizable double bond on the average per mole of the fluorine-containing copolymer. The double bond thus introduced into the fluorine-containing copolymer produces a covalent bond between the dispersion stabilizer and the polymer forming the dispersed particles, thereby achieving further improvements in the storage stability and mechanical stability of the dispersion.

The fluorine-containing copolymers are usable singly or at least two of them can be used in mixture among those different in copolymer composition or molecular weight. When required, a small amount of other dispersion stabilizers is conjointly usable, examples thereof being alkyl-etherified melamine-formaldehyde resin, alkyd resin and usual acrylic resins free of the monomer of the formula (1) as a copolymerizing component.

The nonaqueous dispersion to be used as the top coating of the invention can be prepared by polymerizing a radically polymerizable mohomer in a solution of the fluorine-containing copolymer as a dispersion stabilizer in an organic solvent. The particulate polymer of radically the polymerizable monomer is dispersed in the organic solvent solution.

While the polymer particles of the dispersion produced by the polymerization are substantially insoluble in the organic solvent used in the polymerization, useful organic solvents include those serving as a good solvent for dissolving the dispersion stabilizer and the radically polymerizable monomer. Examples of such organic solvents are aliphatic hydrocarbons such as hexane, heptane, octane and the like; aromatic hydrocarbons such as benzene, toluene, xylene and the like; alcohol-, ether-, ester- or ketone-type solvents such as isopropyl alcohol, n-butyl alcohol, isobutyl alcohol, octyl alcohol, cellosolve, butyl cellosolve, diethylene glycol monobutyl ether, methyl isobutyl ketone, diisobutyl ketone, ethyl acyl ketone, methyl hexyl ketone, ethyl butyl ketone, ethyl acetate, isobutyl acetate, 2-ethylhexyl acetate, etc. These organic solvents are usable singly or at least two of them can be used in mixture. Preferred examples thereof are those predominantly containing aliphatic hydrocarbons, suitably combined with aromatic hydrocarbon or alcohol-, ether-, ester- or ketone-type solvents.

When the fluorine-containing copolymer containing a large amount of the monomer of the formula (1) (e.g. 50% by weight or more) is relatively difficult to dissolve in an organic solvent, it is possible to use a good solvent capable of dissolving the fluorine-containing copolymer such as trichlorotrifluoroethane, metaxylene hexafluoride, tetrachlorohexafluorobutane and the like.

Radically polymerizable monomers which are polymerized in the solution of the dispersion stabilizer in the organic solvent to form a particulate polymer are not specifically limited insofar as they are radically polymerizable monomers having unsaturated bonds. Useful monomers include a wide variety of those known in the art. Typical examples are as follows:

(i) $C_{1-18}$ alkyl acrylate or methacrylate such as methyl acrylate, ethyl acrylate, propyl acrylate, butyl acrylate, hexyl acrylate, octyl acrylate, lauryl acrylate, methyl methacrylate, ethyl methacrylate, propyl methacrylate, butyl methacrylate, hexyl methacrylate, octyl methacrylate, lauryl methacrylate and the like; glycidyl acrylate or methacrylate; $C_{2-8}$ alkenyl acrylate or methacrylate such as allyl acrylate or methacrylate and the like; $C_{2-8}$ hydroxyalkyl acrylate or methacrylate such as hydroxyethyl acrylate or methacrylate, hydroxypropyl acrylate or methacrylate and the like; and $C_{3-18}$ alkenyloxyalkyl acrylate or methacrylate such as allyloxyethyl acrylate or methacrylate and the like;

(ii) vinyl aromatic compounds such as styrene, $\alpha$-methylstyrene, vinyltoluene, p-chlorostyrene, vinylpyridine and the like;

(iii) $\alpha,\beta$-ethylenically unsaturated acids such as acrylic acid, methacrylic acid, itaconic acld and the like;

(iv) others including acrylonitrile, methacrylonitrile, methyl isopropenyl ketone, vinyl acetate, Veoba monomer (trade name, product of Shell Chemical Co., Ltd., U.S.), vinyl propionate, vinyl pivalate, monomers of the formula (1), etc.

The polymerization of the monomers is carried out using a radical polmmerization initiator. Usable radical polymerization initiators include, for example, azo-type initiators such as 2,2'-azobisisobutyronitrile, 2,2'-azobis(2,4-dimethylvaleronitrile) and the like, and peroxide-type initiators such as benzoyl peroxide, lauryl peroxide, tert-butyl peroxide and the like. The polymerization initiator is used in an amount of about 0.2 to about 10 parts by weight, preferably about 0.5 to about 5 parts by weight, per 100parts by weight of the radically polymerizable monomer to be polymerized.

A suitable amount of the dispersion stabilizer in F-NAD, although widely variable depending on its kind, is about 5 to about 80% by weight, preferably about 10 to about 60% by weight, based on the combined amount of the radically polymerizable monomer to be polymerized and the dispersion stabilizer.

The total concentration of the radically polymerizable monomer and the dispersion stabilizer in the organic solvent is in the range of about 30 to about 70% by weight, preferably about 30 to about 60% by weight.

The polymerization can be carried out by conventional methods. The temperature or polymerization reaction is about 60° to about 160° C. The reaction can be completed usually in about 1 to about 15 hours.

F-NAD prepared by the above-mentioned process is excellent in the stability of the dispersion.

F-NAD, although usable per se as the clear top coating of the invention, can be admixed, when required, with additives which would not impair the metallic effect attained by the base coat, such as a coloring agent, plasticizer, curing agent and the like. Examples of useful coloring agents are dyes, organic pigments, inorganic pigments, etc. Useful plasticizers include those known in the art such as dimethyl phthalate, dioctyl phthalate and like low-molecular-weight plasticizers, vinyl polymer plasticizers, polyester plasticizers and like high-molecular-weight plasticizers, etc. These plasticizers can be used as contained in F-NAD or as distributed in the polymer particles of F-NAD prepared by dissolving the plasticizers in the radically polymerizable monomer in preparation of F-NAD. The curing agent is used to cross-link and cure the dispersion stabilizer and the dispersed particles in F-NAD. Useful curing agents are amino resins, epoxy resins, polyisocyanate compounds, blocked polyisocyanate compounds and the like. F-NAD can also be blended with cellulose resins, other acrylic resins, alkyd resins, polyester resins, epoxy resins or the like.

According to the present invention, the base coating and/or the clear top coating may contain an ultraviolet absorber and a light stabilizer. The surface layer in the top coat of the present invention is significantly high in weatherability because of the predominant content of fluorine-containing copolymer in the surface layer. However, the ultraviolet light in the sunlight rays penetrates through the transparent top coat and tends to deteriorate the base coat. Consequently the inclusion of an ultraviolet absorber and a light stabilizer in the base coating and/or clear top coating enhances the weatherability of the base coat as well as the clear top coat. In other words, the presence of the agents can greatly aid in accomplishing the object of improving the weatherability of metallic coat by using the nonaqueous dispersion comprising the fluorine-containing copolymer as the clear top coating. A wide variety of conventional ultraviolet absorbers can be used insofar as the absorber can absorb ultraviolet energy, is compatible with or uniformly dispersible in the resin of the base coating and in the fluorine-containing copolymer of the clear top coating and is unlikely to become inactive by easily decomposing at a baking temperature. Preferred examples of such ultraviolet absorbers are benzophenone-, triazole-, phenylsalicylate-, diphenyl acrylate-, acetophenone-based and like absorbers. When a light stabilizer is used conjointly with the ultraviolet absorber, the weatherability of the base coat and top coat can be further improved. An extensive range of conventional light stabilizers are usable in the present invention insofar as they are compatible with or uniformly dispersible in the resin of the base coating and in the fluorine-containing copolymer of the clear top coating and are not prone to inactivation by easily decomposing at a temperature for baking the coatings. Examples of such light stabilizers are bis (2,2,6,6-tetramethyl-4-piperidyl)-sebacate, bis(1,2,2,6,6-pentamethyl-4-pyperidyl)sebacate, 2-(3,5-di-tert-butyl-4-hydroxybenzyl)-2-n-butyl-malonic acid bis(1,2,2,6,-pentamethyl-4-piperidyl)ester, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, etc. These light stabilizers can be used singly, or at least two of them are usable in mixture.

The amount of the ultraviolet absorber is about 0.1 to about 10% by weight, preferably about 1 to about 5% by weight, based on the resin solids in the base coating or the clear top coating. The amount of the light stabilizer is about 0.1 to about 10%, preferably about 1 to about 5% by weight, based on the resin solids in the base coating or the clear top coating.

<Metallic coating method>

The metallic coating of the present invention can be done by applying the base coating and the clear top coating of the present invention sequentially to form a base coat and a top coat, respectively.

For example, in a 2-coat 1-bake method, the base coating is adjusted to a viscosity of about 10 to about 30 seconds (Ford cup #4, 20° C.) and applied to a substrate to form a base coat having a thickness of about 10 to about 30 $\mu$m when cured. Then the coated substrate is left to stand for about 2 to about 10 minutes at room temperature or at a temperature of 100° C. or lower. Thereafter the clear top coating predominantly containing F-NAD and having a viscosity adjusted to about 20 to about 40 seconds (Ford cup #4, 20° C.) is applied to the coated surface, without curing the base coat, by spraying, electrophoretic coating or like coating method to form a top coat having a thickness of about 20 to about 50 $\mu$m when cured. Thereafter the coated substrate was left to stand at room temperature for about 2 to about 10 minutes and then heated to about 80° to about 160° C. for about 10 to about 30 minutes to cure the base coat and the top coat at the same time, whereby a metallic coat is formed.

According to the present invention, a metallic coat, of course, can be produced also by a 2-coat 2-bake method in which the base coating is applied to a substrate and the base coat is cured at an elevated temperature, or alternatively at room temperature when a resin composition curable at room temperature is used as the base coating, and then the clear top coating is applied, followed by curing the top coat, whereby a metallic coat is formed.

Examples of substrates to be coated are a wide variety of articles such as those made of steel, aluminum, plastics or the like. The base coating can be applied directly to an article to be coated or applied to the primed surface of the article or to the intercoat over the primed article.

The coating methods of the present invention are capable of forming a metallic coat having a good finish appearance and excellent weatherability which coat is unlikely to have impaired gloss and is substantially free of cracks, discoloration, decoloration, blisters and like flaws even in a long-term outdoor exposure.

The present invention will be described below in greater detail with reference to the following preparation examples illustrative of coatings to be used in the present invention, examples illustrative of the present invention and comparison examples in which the parts and percentages are all by weight unless otherwise specified.

Preparation Examples

1. Peparation of base coatings (B-1):

Styrene (15 parts), 15 parts of methyl methacrylate, 40 parts of butyl methacrylate, 13 parts of 2-ethylhexyl acrylate, 15 parts of hydroxyethyl methacrylate and 2 parts of acrylic acid were copolymerized in xylol using azobisisobutyronitrile as a polymerization initiator, giving a solution of acrylic resin having a nonvolatile content of 50%, a varnish acid value of 8.0 and a viscosity of Y (Gardner, 25° C.).

An organic solvent solution-based base coating (B-1) was prepared from the 50% acrylic resin solution thus obtained and the following other components in amounts shown below.

| | | |
|---|---|---|
| 50% Acrylic resin solution | 160 | parts |
| 60% Amino resin (*1) | 33 | parts |
| Aluminum Paste A (*2) | 12 | parts |
| Organic yellow pigment (*3) | 0.01 | part |
| Carbon black (*4) | 0.005 | part |
| 10% Ultraviolet absorber solution-A (*5) | 10 | parts |
| 20% Light stabilizer solution-A (*6) | 5 | parts |

Note:
(*1) Trade name "UVAN 20 SE," n-butanol modified melamine resin, product of Mitsui Toatsu Chemicals, Inc., Japan
(*2) Trade name "Aluminum Paste No. 55-519," product of Toyo Aluminum Kabushiki Kaisha, Japan
(*3) Trade name "Irgazin Yellow 3RCTN," product of Ciba-Geigy, Ltd., Switzerland
(*4) Trade name "Black Pearls 1300," carbon black pigment, product of Cabot Corporation, U.S.A.
(*5) 10% Solution of "Tinuvin 900" (trade name, product of Ciba-Geigy, Ltd., Switzerland) in xylol
(*6) 20% Solution of "SANOL LS 292" (trade name, hindered amine-based light stabilizer, product of Sankyo Company, Limited, Japan) in xylol The base coating thus prepared was adjusted to a viscosity of 14 seconds (Ford cup #4, 20° C.) with a solvent mixture consisting of 40% of toluol, 30% of Swazol #1000 (product of COSMO Oil Company, Limited, Japan) and 30% of butyl acetate.

(B-2):

Methyl methacrylate (40 parts), 5 parts of butyl methacrylate, 40 parts of ethyl acrylate, 13 parts of hydroxyethyl methacrylate and 2 parts of acrylic acid were copolymerized in xylol using azobisisobutyronitrile as a polymerization initiator, giving a solution of acrylic resin having a nonvolatile content of 50%, a varnish acid value of 8.0 and a viscosity of Y (Gardner, 25° C.).

An organic solvent solution-based base coating (B-2) was prepared from the 50% acrylic resin solution thus obtained and the following other components in amounts shown below.

| | | |
|---|---|---|
| 50% Acrylic resin solution | 160 | parts |
| 60% Amino resin (*1) | 33 | parts |
| Aluminum Paste A (*2) | 12 | parts |
| Organic yellow pigment (*3) | 0.01 | part |
| Carbon black (*4) | 0.005 | part |
| 10% Ultraviolet absorber solution-A (*5) | 10 | parts |
| 20% Light stabilizer solution-A (*6) | 5 | parts |

(B-3):

Using as a dispersion stabilizer 210 parts of a graft polymer prepared from a poly-12-hydroxystearic acid and methacrylic acid copolymer, 100 parts of vinyl monomers (a mixture of 30 parts of styrene, 30 parts of methyl methacrylate, 23 parts of 2-ethylhexyl acrylate, 15 parts of hydroxyethyl acrylate and 2 parts of acrylic acid) were subjected to dispersion polymerization in n-heptane in usual manner, giving a nonaqueous dispersion having a nonvolatile content of 50%.

A nonaqueous dispersion-based base coating (B-3) having the following composition and containing a ultraviolet absorber was prepared.

| | | |
|---|---|---|
| 50% Nonaqueous dispersion | 160 | parts |
| 60% Amino resin (*1) | 33.3 | parts |
| Aluminum Paste A (*2) | 12 | parts |
| Organic yellow pigment (*3) | 0.01 | part |
| Carbon black (*4) | 0.005 | part |
| 10% Ultraviolet absorber solution-B (*7) | 10 | parts |

Note:
(*7) Solution of 10 parts of 2,2',4,4'-tetrahydroxybenzophenone in 90 parts of methyl ethyl ketone The base coating thus obtained was adjusted to a viscosity of 14 seconds (Ford cup #4, 20° C.) with a solvent mixture of 30 parts of an aliphatic hydrocarbon solvent (product of COSMO Oil Co., Ltd., trade name "Swasol #1500"), 60 parts of cellosolve acetate and 10 parts of carbitol acetate.

(B-4):

Using as a dispersion stabilizer 210 parts of a graft polymer prepared from a poly-12-hydroxystearic acid and a methacrylic acid copolymer, 100 parts of vinyl monomers (a mixture of 15 parts of styrene, 20 parts of n-butyl acrylate, 40 parts of methyl methacrylate, 23 parts of hydroxyethyl acrylate and 2 parts of acrylic acid) were subjected to dispersion polymerization in n-heptane in usual manner, giving a nonaqueous dispersion having a nonvolatile content of 50%.

A nonaqueous dispersion-based base coating (B-4) having the following composition and containing a ultraviolet absorber was prepared.

| | | |
|---|---|---|
| 50% Nonaqueous dispersion | 160 | parts |
| 60% Amino resin (*1) | 33.3 | parts |
| Aluminum Paste A (*2) | 12 | parts |
| Organic yellow pigment (*3) | 0.01 | part |
| Carbon black (*4) | 0.005 | part |
| 10% Ultraviolet absorber solution-B (*7) | 10 | parts |

(B-5):

| | |
|---|---|
| Styrene | 20 parts |
| Methyl methacrylate | 10 parts |
| Butyl methacrylate | 25 parts |
| 2-Ethylhexyl acrylate | 30 parts |
| 2-Hydroxyethyl acrylate | 10 parts |
| Acrylic acid | 5 parts |

The monomers having the above composition were subjected to solution polymerization using an ethylene glycol monoethyl ether, producing an acrylic resin having a nonvolatile content of 70% and a molecular weight of about 14,000. The acrylic resin thus obtained was neutralized with an equivalent amount of dimethylethanolamine and was thereby rendered water-soluble. Deionized water was added to the resin to give an aqueous solution of acrylic resin (A-1) having a nonvolatiile content of 55%.

A metallic basecoating (B-5) having the following composition was prepared using the aqueous solution of acrylic resin (A-1)

| | | |
|---|---|---|
| Acrylic resin solution (A-1) | 75.20 | parts |
| Amino resin (*8) | 10.28 | parts |

| | |
|---|---|
| Aluminum Paste B (*9) | 12.23 parts |
| Catalyst for curing (*10) | 1.00 part |

Note:
(*8) Trade name "CYMEL 303," product of Mitsui Toatsu Chemicals, Inc., Japan
(*9) Trade name "Aluminum Paste 1570N," product of Toyo Aluminum Kabushiki Kaisha, Japan
(*10) Paratoluenesulfonic acid The metallic base coating (B-5) was diluted with deionized water to a viscosity of 14 seconds (Ford cup #4, 20° C.).

(B-6):

| | |
|---|---|
| Styrene | 5 parts |
| Methyl methacrylate | 25 parts |
| Butyl methacrylate | 25 parts |
| 2-Ethylhexyl acrylate | 25 parts |
| 2-Hydroxyethyl acrylate | 17 parts |
| Methacrylic acid | 3 parts |

An emulsion containing a resin with a molecular weight of about 50,000 and a particle size of 0.1 to 0.3 μm and having a nonvolatile content of 45% was prepared from the monomers having the above composition by a usual emulsion polymerization method. The emulsion was adjusted to a pH of 8 with dimethyl ethanol amine for stabilization, giving an acrylic resin emulsion (AE-1).

Using this acrylic resin emulsion (AE-1), an aqueous dispersion-based metallic base coating (B-6) having the following composition was prepared.

| | |
|---|---|
| Acrylic resin emulsion (AE-1) | 177.8 parts |
| Amino resin (*8) | 20.4 parts |
| Aluminum Paste B (*9) | 18.5 parts |
| Catalyst for curing (*10) | 2.0 parts |

The metallic base coating (B-6) was diluted with deionize water to a viscosity of 14 seconds (Ford cup #4, 20° C.).

| | |
|---|---|
| Acrylic resin (A-1) | 72.7 parts |
| Acrylic resin emulsion (AE-1) | 88.9 parts |
| Amino resin (*8) | 20.4 parts |
| Aluminum Paste B (*9) | 18.5 parts |
| Catalyst for curing (*10) | 2.0 parts |

A metallic base coating (B-7) was prepared from a mixture of the above composition.

The metallic bases coating (B-7) thus obtained was diluted with deionized water to a viscosity of 14 seconds (Ford cup #4, 20° C.).

2. Preparation of clear top coatings (T-1):

(1) Preparation of dispersion stabilizer

Isobutyl acetate (40 parts) and 40 parts of toluene were refluxed with heating and the following monomers and polymerization initiator were added dropwise over a period of 3 hours. The mixture was subjected to aging for 2 hours after the dropwise addition.

| | |
|---|---|
| 2-Perfluorooctylethyl methacrylate | 50 parts |
| Styrene | 10 parts |
| Isobutyl methacrylate | 19 parts |
| 2-Ethylhexyl methacrylate | 10 parts |
| 2-Hydroxyethyl methacrylate | 10 parts |

| | |
|---|---|
| Methacrylic acid | 1 part |
| 2,2'-Azobisisobutyronitrile | 2 parts |

The resin varnish thus obtained was found to have a nonvolatile content of 55%, a viscosity of G (Gardner, 25° C.) and a weight average molecular weight of about 16,000.

(2) Preparation of nonaqueous dispersion

A flask was charged with 93 parts of heptane and 98 parts of the dispersion stabilizer obtained above. The mixture was refluxed with heating, and the following monomers and polymerization initiator were added dropwise over a period of 3 hours. The mixture was subjected to aging for 2 hours.

| | |
|---|---|
| Styrene | 15 parts |
| Methyl methacrylate | 40 parts |
| Acrylonitrile | 30 parts |
| 2-Hydroxyethyl methacrylate | 15 parts |
| Tert-butyl peroxy 2-ethylhexanoate | 1.5 parts |

The dispersion thus bbtained was found to be an opaque white, stable low-viscosity polymer dispersion having a nonvolatile content of 53% and a viscosity of A (Gardner, 25° C.) and containing a resin of 0.2 to 0.3 μm particle size (as measured with an electron microscope, the same hereinafter). After standing at room temperature for 3 months, the dispersion contained no precipitate nor coarse particle.

(T-2):

(1) Preparation of dispersion stabilizer

Isobutyl acetate (40 parts) and 40 parts of toluene were refluxed with heating and the following monomers and polymerization initiator were added dropwise over a period of 3 hours. The mixture was subjected to aging for 2 hours after the dropwise addition.

| | |
|---|---|
| 2-Perfluoroisononylmethyl methacrylate | 30 parts |
| Styrene | 15 parts |
| Isobutyl methacrylate | 30 parts |
| 2-Hydroxyethyl methacrylate | 10 parts |
| Methacrylic acid | 1 part |
| 2,2'-Azobisisobutyronitrile | 1.8 parts |

The resin varnish thus obtained was found to have a nonvolatile content of 55%, a viscosity of J (Gardner, 25° C.) and a weight average molecular weight of about 16,000.

To the whole of the resin varnish were added 1.0 part of glycidyl acrylate, 0.02 part of 4-tertbutylpyrocatechol and 0.1 part of dimethylaminoethanol. The mixture was refluxed for 5 hours to introduce copolymerizable double bonds into the molecular chains of dispersion stabilizer in an amount of about 0.8 mole per mole of the molecule as determined by the measurement of the acid value of resin.

(2) Preparation of nonaqueous dispersion

A flask was charged with 82 parts of heptane and 121 parts of the dispersion stabilizer obtained above. The mixture was refluxed with heating and the following monomes and polymerization initiator were added dropwise over a period of 3 hours. The mixture was subjected to aging for 2 hours.

| | |
|---|---|
| Styrene | 15 parts |

| | |
|---|---|
| Methyl methacrylate | 30 parts |
| Acrylonitrile | 40 parts |
| 2-Hydroxyethyl methacrylate | 15 parts |
| 2,2'-Azobisisobutyronitrile | 2 parts |

The dispersion thus obtained was found to be an opaque white, stable low-viscosity polymer dispersion having a nonvolatile content of 55% and a viscosity of C (Gardner, 25° C.) and containing a resin of 0.15 to 0.20 μm particle size. After standing at room temperature for 3 months, the dispersion contained no precipitate nor coarse particle.

(T-3):

(1) Preparation of dispersion stabilizer

Metaxylenehexafluoride (80 parts) was heated and maintained at 110° C. The following monomers and polymerization initiator were added dropwise over a period of 3 hours. The mixture was subjected to aging for 2 hours after the dropwise addition.

| | |
|---|---|
| 2-Perfluorooctylethyl acrylate | 50 parts |
| Styrene | 30 parts |
| n-Butyl methacrylate | 10 parts |
| 2-Hydroxyethyl methacrylate | 10 parts |
| 2,2'-Azobisisobutyronitrile | 2 parts |

The resin varnish thus obtained was found to have a nonvolatile content of 55%, a viscosity of C (Gardner, 25° C.) and a weight average molecular weight of about 16,000.

(2) Preparation of nonaqueous dispersion

A flask was charged with 20 parts of cyclohexane, 62 parts of metaxylenehexafluoride and 121 parts of the dispersion stabilizer obtained above. The mixture was refluxed with heating, and the following monomers and polymerization initiator were added dropwise over a period of 3 hours. The mixture was subjected to aging for 2 hours.

| | |
|---|---|
| Styrene | 15 parts |
| Methyl methacrylate | 42 parts |
| Acrylonitrile | 20 parts |
| Glycidyl methacrylate | 5 parts |
| Acrylic acid | 3 parts |
| 2-Hydroxyethyl acrylate | 15 parts |
| 2,2'-Azobisisobutyronitrile | 2 parts |

The dispersion thus obtained was found to be an opaque white, stable low-viscosity polymer dispersion having a nonvolatile content of 55% and a viscosity of B (Gardner, 25° C.) and containing a resin of 0.18 to 0.20 μm particle size. Inside the resin particle, crosslinking occurred by the reaction between the epoxy group of the glycidyl methacrylate and the carboxyl group of the acrylic acid. After standing at room temperature for 3 months, the dispersion contained no precipitate nor coarse particle.

(T-4):

(1) Preparation of dispersion stabilizer

Isobutyl acetate (50 parts) and 30 parts of toluene were refluxed with heating, and the following monomers and polymerization initiator were added dropwise over a period of 3 hours. The mixture was subjected to aging for 3 hours after the dropwise addition.

| | |
|---|---|
| 2-Perfluorooctylethyl methacrylate | 40 parts |
| Styrene | 10 parts |
| Isobutyl methacrylate | 19 parts |
| 2-Ethylhexyl methacrylate | 10 parts |
| 2-Hydroxyethyl methacrylate | 20 parts |
| Methacrylic acid | 1 part |
| Tert-butyl peroxy 2-ethylhexanoate | 3 parts |

The resin varnish thus obtained was found to have a nonvolatile content of 55%, a viscosity of G (Gardner, 25° C.) and a weight average molecular weight of about 16,000.

To the whole of the resin varnish were added 0.8 part of glycidyl acrylate, 0.02 part of 4-tertbutylpyrocatechol and 0.1 part of dimethylaminoethanol. The mixture was refluxed for 5 hours to introduce copolymerizable double bonds into the molecular chains of dispersion stabilizer in an amount of about 0.6 mole per mole of the molecule as determined by the measurement of the acid value of resin.

(2) Preparation of nonaqueous dispersion

A flask was charged with 93 parts of heptane and 98 parts of the dispersion stabilizer obtained above. The mixture was refluxed with heating, and the following monomers and polymerization initiator were added dropwise over a period of 3 hours. The mixture was subjected to aging for 2 hours.

| | |
|---|---|
| Styrene | 10 parts |
| Methyl methacrylate | 45 parts |
| Acrylonitrile | 25 parts |
| 2-Perfluorooctylethyl methacrylate | 5 parts |
| 2-Hydroxyethyl methacrylate | 15 parts |
| Tert-butyl peroxy 2-ethylhexanoate | 1.5 parts |

The dispersion thus obtained was found to be an opaque white, stable low-viscosity polymer dispersion having a nonvolatile content of 55% and a viscosity of H (Gardner, 25° C.) and containing a resin of 0.2 to 0.3 μm particle size. The dispersion contained no precipitate nor coarse particle after standing at room temperature for 3 months.

(T-5):

Preparation of nonaqueous dispersion

A flask was charged with 102 parts of heptane, 8 parts of n-butyl acetate and 108 parts of the dispersion stabilizer obtained above for (T-4). The mixture was refluxed with heating, and the following monomers and polymerization initiator were added dropwise over a period of 3 hours. The mixture was subjected to aging for 2 hours and then 26 parts of n-butyl acetate was added.

| | |
|---|---|
| Styrene | 15 parts |
| Methyl methacrylate | 17 parts |
| Acrylonitrile | 30 parts |
| 2-Hydroxyethyl methacrylate | 15 parts |
| Glycidyl methacrylate | 20 parts |
| Methacrylic acid | 3 parts |
| Tert-butyl peroxy 2-ethylhexanoate | 1.5 parts |

The dispersion thus obtained was found to be an opaque white, stable low-viscosity polymer dispersion having a nonvolatile content of 46% and a viscosity of B (Gardner, 25%) and containing a resin of 0.12 μm particle size. After standing at room temperature for 3 months, the dispersion contained no precipitate nor coarse particle.

(T-6):

Styrene (15 parts), 42 parts of n-butyl methacrylate, 23 parts of 2-ethylhexyl methacrylate, 18 parts of hydroxyethyl methacrylate and 2 parts of acrylic acid were copolymerized in xylol using azobisisobutyronitrile as a polymerization initiator, giving an acrylic resin solution having a heating residue of 50%, a varnish acid value of 9.0, a viscosity of H (Gardner, 25° C.) and a weight average molecular weight of about 16,000.

(T-7):

(1) Preparation of dispersion stabilizer

Isobutyl acetate (40 parts) and 40 parts of toluene were refluxed with heating, and the following monomers and polymerization initiator were added dropwise over a period of 3 hours. The mixture was subjected to aging for 2 hours after the dropwise addition.

| | |
|---|---|
| Styrene | 10 parts |
| Isobutyl methacrylate | 69 parts |
| 2-Ethylhexyl methacrylate | 10 parts |
| 2-Hydroxyethyl methacrylate | 10 parts |
| Methacrylic acid | 1 part |
| 2,2'-Azobisisobutyronitrile | 2 parts |

The resin varnish thus obtained was found to have a nonvolatile content of 55%, a viscosity of H (Gardner, 25° C.) and a weight average molecular weight of about 16,000.

(2) Preparation of nonaqueous dispersion

A flask was charged with 93 parts of heptane and 98 parts of the dispersion stabilizer obtained above. The mixture was refluxed with heating, and the following monomers and polymerization initiator were added dropwise over a period of 3 hours. The mixture was subjected to aging for 2 hours.

| | |
|---|---|
| Styrene | 15 parts |
| Methyl methacrylate | 40 parts |
| Acrylonitrile | 30 parts |
| 2-Hydroxyethyl methacrylate | 15 parts |
| Tert-butylperoxy 2-ethylhexanoate | 1.5 parts |

The dispersion thus obtained was found to be an opaque white, stable low-viscosity polymer dispersion having a nonvolatile content of 53% and a viscosity of B (Gardner, 25° C.) and containing a resin of 0.2 to 0.3 μm particle size. After standing at room temperature for 3 months, the dispersion contained no precipitate nor coarse particle.

(T-8):

A solution of the dispersion stabilizer obtained above in (T-1).

(T-9):

A solution of the dispersion saabilizer obtained above in (T-3).

Nine clear top coating specimens which will be hereinafter referred to as (T-1 AM) to (T-9 AM), respectively were each prepared by adding to each of the dispersions or solutions obtained in (T-1) to (T-9) 15 parts (calculated as solids) of amino resin (*1) per 85 parts of solids of the resin in the dispersion or solution, and 10 parts of a 10% ultraviolet absorber solution (*5) and 5 parts of a 10% light stabilizer solution (*6), per 100 parts of the two resins as combined and adjusting the mixture to a viscosity of 20 to 40 seconds (Ford cup #4, 20° C.) with Swazol #1,000, the top coating (T-9 AM) being free of the amino resin.

Aside from the preparation of the above specimens, nine clear top coating specimens which will be hereinafter referred to as (T-1 NCO) to (T-9 NCO), respectively were each prepared by adding to each of the dispersions or solutions obtained in (T-1) to (T-9) a polyisocyanate compound (*12) in such amount that 1 mole of isocyanate group is present per mole of hydroxyl group in the resin of the dispersion or solution, and 10 parts of a 10% ultraviolet absorber solution (*5) and 5 parts of a 10% light stabilizer solution (*11), per 100 parts of the resin solids, and adjusting the mixture to a viscosity of 20 to 40 seconds (Ford cup #4, 20° C.) with cellosolve acetate, the top coating (T-9 NCO) being free of the polyisocyanate compound.

Note:
(*11) 10% Solution of "Tinuvin 144" (trade name, product of Ciba-Geigy Ltd., Switzerland) in xylol
(*12) Product of Nippon Polyurethane Industry, Japan, non-yellowing block isocyanate DC-2725

EXAMPLES AND COMPARISON EXAMPLES

An epoxyamide-based cationic electrodeposition primer for automobiles and a surfacer were applied to a mild steel panel degreased and treated with zinc phosphate. One of the base coatings prepared above was applied to the cured coat of surfacer on the panel to form a base coat having a thickness of 15 μm when cured. The coated panel was left to stand at 20° C. for 4 minutes and then one of the clear top coatings prepared above was applied to the coated panel by wet-on-wet technique to form a top coat having a thickness of 30 μm when cured. Thereafter the coated panel was heated to 140° C. for 30 minutes to cure the base coat and the top coat at the same time.

In this way, 32 kinds of coated panels (Examples 1 to 18 and Comparison Examples 1 to 14) were produced using the base coatings and the clear top coatings as shown below in Table 1. The coated panels were tested for various properties of coat by the following methods. Table 2 below shows the results of the tests.

<Accelerated weathering test>

An accelerated weathering test was conducted using a QUV weather-O-meter manufactured by The Q Panel Company. One cycle of test operation was performed under the test conditions of:
Ultraviolet-light irradiation: 16 hours, 60° C.
Water condensation: 8 hours, 50° C.

Each coated panel was checked after 5,000 hours (208 cycles).

<Gloss>

The gloss of each coated panel was determined at a specular reflectance of 60° and 20° before and after accelerated weathering test.

<Surface tension>

The surface tension was determined using water and paraffin in terms of the angle of contact formed by these liquids.

<Appearance>

The appearance of coat was observed with the unaided eye and evaluated according to the following ratings:

(A) No change.

(B) The coat was found to have a thickness locally reduced.
(C) Cracking or blistering occurred in small numbers.
(D) Cracking, blistering or discoloration occurred in great numbers.

<Distinctness-of-image gloss>

A portable gloss distinctness tester was used.

<Adhesion>

The coated panel was cut crosswise to the surface of the substrate. An adhesive celophane tape was adhered to the coating surface and then peeled off. The appearance of coating surface after peeling was observed with the unaided eye and evaluated according to the following ratings.
(A) Peeling scarcely occurred.
(B) Peeling occurred to a slight extent.
(C) Peeling occurred to a conspicuous extent.

<Hardness>

The coat of the coated panel was checked for scratch hardness using a pencil (trade name "Mitsubishi Uni," product of Mitsubishi Pencil Co., Ltd., Japan)

<Impact resistance>

The coated panel was placed onto a specimen support having a diameter of 0.5 in. at 20° C. with the coating surface up. A weight of 500 g was dropped onto the coating surface to determine such maximum height (cm) that when the weight was dropped from the height, no cracking or the like took place on the coating surface.

<Resistance to gasoline>

The coated panel was immersed in gasoline (trade name "Super Gasoline," product of Nippon Oil Co., Ltd., Japan) at 20° C. for 24 hours. The gasoline resistance of the coat was evaluated according to the following ratings:
(A) No change.
(B) Swelling or gloss reduction occurred.

<Resistance to alkali>

Onto the coating surface of coated panel was dropped 3 cc of 0.1 N-sodium hydroxide, and then the coated panel was left to stand at 55° C. for 4 hours after which the coating surface was observed. The alkali resistance of the coat was evaluated according to the following ratings.
(A) No change.
(B) Swelling or gloss reduction occurred.

TABLE 1

| Coatings used | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Base coating | B-1 | B-1 | B-4 | B-4 | B-3 | B-3 | B-2 | B-2 | B-1 | B-3 | B-5 | B-5 | B-7 | B-7 | B-6 |
| Clear top coating | T-1 AM | T-4 AM | T-2 AM | T-5 AM | T-1 NCO | T-4 NCO | T-2 NCO | T-5 NCO | T-3 AM | T-3 NCO | T-1 AM | T-4 AM | T-2 NCO | T-5 NCO | T-1 NCO |

| Coatings used | Example | | | Comparison Example | | | | | | | | | | | | | |
|---|---|---|---|---|---|---|---|---|---|---|---|---|---|---|---|---|---|
| | 16 | 17 | 18 | 1 | 2 | 3 | 4 | 5 | 6 | 7 | 8 | 9 | 10 | 11 | 12 | 13 | 14 |
| Base coating | B-6 | B-5 | B-7 | B-1 | B-3 | B-1 | B-3 | B-1 | B-1 | B-3 | B-5 | B-7 | B-5 | B-7 | B-5 | B-5 | B-7 |
| Clear top coating | T-4 NCO | T-2 AM | T-5 AM | T-6 AM | T-6 NCO | T-7 AM | T-7 NCO | T-8 AM | T-9 AM | T-9 AM | T-6 AM | T-6 NCO | T-7 AM | T-7 NCO | T-8 AM | T-9 AM | T-9 AM |

A Du Pont impact tester was used.

TABLE 2

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Gloss[1] | | | | | | | | | | | | | | | | | | |
| 60° before AW test[2] | 94 | 94 | 93 | 93 | 95 | 95 | 95 | 94 | 96 | 96 | 95 | 94 | 96 | 96 | 95 | 95 | 96 | 97 |
| after AW test | 90 | 90 | 91 | 91 | 91 | 91 | 90 | 90 | 87 | 86 | 89 | 90 | 91 | 91 | 90 | 90 | 86 | 86 |
| 20° before AW test | 80 | 81 | 80 | 80 | 84 | 84 | 83 | 83 | 86 | 87 | 81 | 82 | 85 | 85 | 84 | 83 | 86 | 87 |
| after AW test | 57 | 57 | 57 | 58 | 56 | 57 | 57 | 57 | 51 | 51 | 56 | 57 | 57 | 55 | 57 | 55 | 53 | 51 |
| Surface tension[1] | | | | | | | | | | | | | | | | | | |
| before AW test | 20 | 20 | 23 | 20 | 23 | 23 | 25 | 23 | 19 | 20 | 20 | 20 | 23 | 23 | 25 | 23 | 19 | 20 |
| after AW test | 31 | 30 | 36 | 35 | 34 | 33 | 33 | 33 | 38 | 39 | 32 | 31 | 32 | 34 | 33 | 34 | 39 | 39 |
| Appearance[1] | A | A | A | A | A | A | A | A | A | A | A | A | A | A | A | A | A | A |
| Distinctness-of-image gloss[1] | 0.5 | 0.6 | 0.5 | 0.5 | 0.5 | 0.6 | 0.5 | 0.5 | 0.4 | 0.4 | 0.6 | 0.7 | 0.6 | 0.6 | 0.6 | 0.6 | 0.5 | 0.5 |
| Adhesion[1] | A | A | A | A | A | A | A | A | A | A | A | A | A | A | A | A | A | A |
| Hardness | F | F | F | F | HB | HB | HB | HB | H | HB | F | F | HB | HB | HB | HB | H | HB |
| Impact resistance | 40 | 40 | 40 | 40 | 50 | 50 | 50 | 50 | 40 | 40 | 40 | 40 | 50 | 50 | 50 | 50 | 40 | 40 |
| Gasoline resistance | A | A | A | A | A | A | A | A | A | A | A | A | A | A | A | A | A | A |
| Alkali resistance | A | A | A | A | A | A | A | A | A | A | A | A | A | A | A | A | A | A |

| | Comparison Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Gloss[1] | | | | | | | | | | | | | | |
| 60° before AW test[2] | 100 | 100 | 99 | 100 | 94 | 96 | 96 | 100 | 100 | 100 | 100 | 95 | 96 | 95 |
| after AW test | 72 | 70 | 74 | 70 | 85 | 85 | 85 | 70 | 68 | 74 | 68 | 85 | 85 | 83 |
| 20° before AW test | 90 | 91 | 90 | 91 | 80 | 86 | 86 | 90 | 91 | 90 | 92 | 80 | 87 | 87 |
| after AW test | 15 | 20 | 24 | 23 | 48 | 42 | 42 | 14 | 18 | 20 | 21 | 48 | 41 | 41 |
| Surface tension[1] | | | | | | | | | | | | | | |
| before AW test | 40 | 41 | 40 | 40 | 19 | 18 | 18 | 40 | 41 | 40 | 40 | 19 | 18 | 18 |
| after AW test | * | * | * | * | 29 | 30 | 30 | * | * | * | * | 29 | 30 | 31 |
| Appearance[1] | D | D | D | D | C | C | C | D | D | D | D | C | C | C |
| Distinctness-of-image gloss[1] | 0.1 | 0.1 | 0.1 | 0.1 | 0.3 | 0.3 | 0.3 | 0.1 | 0.1 | 0.1 | 0.1 | 0.3 | 0.3 | 0.3 |
| Adhesion[1] | C | C | C | C | B | B | B | C | C | C | C | B | B | B |

TABLE 2-continued

| Hardness | H | HB | HB | HB | F | F | F | H | HB | HB | HB | F | F | F |
|---|---|---|---|---|---|---|---|---|---|---|---|---|---|---|
| Impact resistance | 20 | 30 | 25 | 30 | 25 | 25 | 25 | 20 | 30 | 25 | 30 | 25 | 25 | 25 |
| Gasoline resistance | A | A | A | A | A | A | A | A | A | A | A | A | A | A |
| Alkali resistance | A | A | A | A | A | A | A | A | A | A | A | A | A | A |

Note:
*The surface tension was not measurable because cracking occurred in great number.
(1)The gloss, surface tension, appearance, distinctness-of-image gloss and adhesion were determined or evaluated after accelerated weathering test was conducted.
(2)AW test = accelerated weathering test.

We claim:

1. A metallic coating method for forming a metallic coat, comprising the steps of:
   (1) applying to a substrate a base coating composition containing a metallic pigment; and
   (2) applying a clear top coating composition on top of the base coating composition, said clear top coating composition being a curable composition consisting essentially of a non-aqueous dispersion of particles of a polymer of a radically polymerizable monomer, said particles being dispersed in a nonaqueous medium which consists essentially of a solution of a dispersion stabilizer in a non-aqueous solvent, wherein said dispersion stabilizer is a fluorine-cotaining copolymer containing 5-40 percent by weight of a hydroxyl group-containing monomer and 1-80 percent by weight of a perfluoroalkyl group-containing acrylic or methacrylic monomer represented by the formula (1)

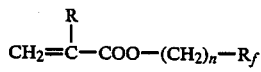

$$CH_2=\overset{R}{\underset{|}{C}}-COO-(CH_2)_n-R_f \quad (1)$$

wherein R is a hdyrogen atom or a methyl group, n is an integer of 1 to 11, and $R_f$ is a straight chain or branched chain perofluoroalkyl group having 1-21 carbon atoms,
wherein the amount of the dispersion stabilizer is 5-80 percent by weight, based on the combined amount of the radically polymerizable monomer and the dispersion stabilizer.

2. A metallic coating method according to claim 1 wherein the metallic pigment-containing base coating composition is applied to a substrate, then a clear top coating composition is applied to the coated surface, and the coated substrate is heated to cure the base coat and the top coat at the same time.

3. A metallic coating method according to claim 1 wherein the metallic pigment-containing base coating composition is an organic solvent solution-based, nonaqueous dispersion-based, aqueous solution-based, or aqueous dispersion-based coating composition.

4. A metallic coating method according to claim 1 wherein the perfluoroalkyl group-containing acrylic or methacrylic monomer of the formula (1) is a monomer wherein n is an integer of 1 to 4 and $R_f$ is a straight chain or branched chain perfluoroalkyl group having 1 to 10 carbon atoms.

5. A metallic coating method according to claim 1 wherein the perfluoroalkyl group-containing acrylic or methacrylic monomer of the formula (1) is at least one monomer selected from the group consisting of perfluoromethylmethyl acrylate, perfluoroisononylmethyl methacrylate, 2-perfluorooctylethyl acrylate and 2-perfluorooctylethyl methacrylate.

6. A metallic coating method according to claim 1 wherein the hydroxyl group-containing monomer is $C_2$-$C_8$ hydroxyalkyl acrylate or methacrylate.

* * * * *